United States Patent
Hamilton et al.

(10) Patent No.: US 11,029,702 B2
(45) Date of Patent: Jun. 8, 2021

(54) VEHICLE SERVICE CONTROLLER

(71) Applicant: Ford Global Technologies, LLC, Dearborn, MI (US)

(72) Inventors: Kathryn Hamilton, West Bloomfield, MI (US); Michael Adel Awad Alla, Novi, MI (US); Ray Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 16/265,787

(22) Filed: Feb. 1, 2019

(65) Prior Publication Data

US 2020/0249693 A1 Aug. 6, 2020

(51) Int. Cl.

| | |
|---|---|
| *G05D 1/02* | (2020.01) |
| *B60R 16/023* | (2006.01) |
| *B60R 25/25* | (2013.01) |
| *B60R 25/23* | (2013.01) |
| *H04W 4/80* | (2018.01) |
| *H04W 4/44* | (2018.01) |
| *B60R 25/24* | (2013.01) |

(52) U.S. Cl.
CPC ....... *G05D 1/0276* (2013.01); *B60R 16/0231* (2013.01); *B60R 25/23* (2013.01); *B60R 25/24* (2013.01); *B60R 25/25* (2013.01); *H04W 4/44* (2018.02); *H04W 4/80* (2018.02); *G05D 2201/0213* (2013.01)

(58) Field of Classification Search
CPC ..... B60R 16/0231; B60R 25/23; B60R 25/24; B60R 25/25; G05D 1/0276; G05D 2201/0213; H04W 4/44; H04W 4/80
See application file for complete search history.

(56) References Cited

U.S. PATENT DOCUMENTS

| | | | |
|---|---|---|---|
| 2015/0166009 A1* | 6/2015 | Outwater | ............... B60R 25/04 701/2 |
| 2018/0164798 A1 | 6/2018 | Poeppel et al. | |
| 2018/0212780 A1 | 7/2018 | Talamonti et al. | |
| 2020/0064825 A1* | 2/2020 | Woodley | .............. G05D 1/0011 |

FOREIGN PATENT DOCUMENTS

| | | |
|---|---|---|
| CN | 107783445 A | 3/2018 |
| DE | 102014007915 A1 | 12/2015 |
| GB | 2550656 A | 11/2017 |
| JP | 200833438 A | 2/2008 |

* cited by examiner

*Primary Examiner* — Rachid Bendidi
*Assistant Examiner* — Ali Wahab
(74) *Attorney, Agent, or Firm* — Frank A. MacKenzie; Bejin Bieneman PLC

(57) ABSTRACT

A system, comprising a computer that includes a processor and a memory, the memory storing instructions executable by the processor to receive authentication an operator of a service controller from a server computer, identify a vehicle by scanning a physical code with the service controller and pair the service controller with the vehicle. The vehicle can be operated with the service controller.

20 Claims, 5 Drawing Sheets

VEHICLE SERVICE CONTROLLER

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
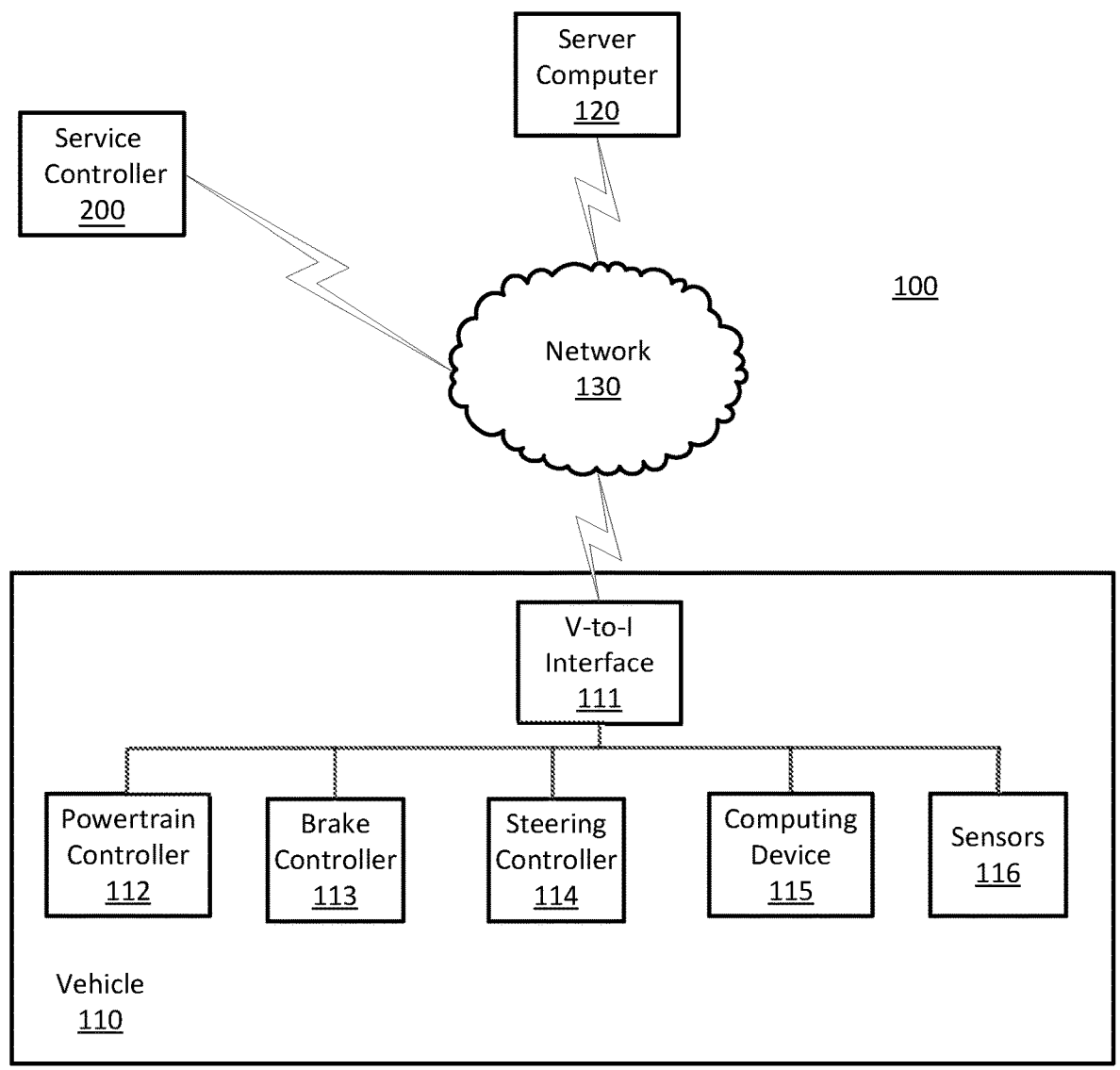
FIG. 1 is a block diagram of an example vehicle control system.

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer. Vehicles equipped to operate in autonomous mode can be configured without operator controls for operating the vehicle. For example, an autonomous vehicle can be configured without a steering wheel, accelerator pedal or brake pedal. A service controller is a hand-held device that can be used by an operator to control one or more of vehicle powertrain, steering and braking to operate the vehicle in non-autonomous or semi-autonomous mode, including in examples in which a vehicle is without operator controls.

Disclosed herein is a method, including receiving authentication of an operator of a service controller from a server computer, identifying a vehicle by scanning a physical code with the service controller, pairing the service controller with the vehicle and operating the vehicle by a command from the service controller. The physical code can be scanned by scanning of one or more of a bar code, a license plate or a VIN number. The service controller can be paired with the vehicle by communicating with the vehicle via a near-field wireless network. The operator can be authenticated by uploading one or more of biometric data, an electronic key or a password to the server computer. The vehicle can be operated based on receiving permission to operate from the server computer.

The server computer can determine permission to operate based on authenticating the operator, identifying the vehicle based on the physical code and identifying the vehicle based on pairing the vehicle. The server computer can determine permission to operate based on comparing the vehicle identity based on the physical code with the vehicle identity based on pairing. The server computer can determine permission to operate based on authenticating the operator. The server computer can determine permission to operate based on a geographic location of the vehicle. The operator can be authenticated with a secure, scalable cloud-based computing resource. The secure, scalable cloud-based computing resource can authenticate the operator using a list of authorized operators. Authenticating the operator can include determining that the operator is not authenticated to operate another vehicle. The vehicle can be identified with a secure, scalable, cloud-based computing resource. The secure, scalable cloud-based computing resource can identify the operator using a database of vehicles.

Further disclosed is a computer readable medium, storing program instructions for executing some or all of the above method steps. Further disclosed is a computer programmed for executing some or all of the above method steps, including a computer apparatus, programmed to receive authentication of an operator of a service controller from a server computer, identify a vehicle by scanning a physical code with the service controller, pair the service controller with the vehicle and operate the vehicle by a command from the service controller. The physical code can be scanned by scanning of one or more of a bar code, a license plate or a VIN number. The service controller can be paired with the vehicle by communicating with the vehicle via a near-field wireless network. The operator can be authenticated by uploading one or more of biometric data, an electronic key or a password to the server computer. The vehicle can be operated based on receiving permission to operate from the server computer.

The server computer can be programmed to determine permission to operate based on authenticating the operator, identifying the vehicle based on the physical code and identifying the vehicle based on pairing the vehicle. The server computer can determine permission to operate based on comparing the vehicle identity based on the physical code with the vehicle identity based on pairing. The server computer can determine permission to operate based on authenticating the operator. The server computer can determine permission to operate based on a geographic location of the vehicle. The operator can be authenticated with a secure, scalable cloud-based computing resource. The secure, scalable cloud-based computing resource can authenticate the operator using a list of authorized operators. Authenticating the operator can include determining that the operator is not authenticated to operate another vehicle. The vehicle can be identified with a secure, scalable, cloud-based computing resource. The secure, scalable cloud-based computing resource can identify the operator using a database of vehicles.

FIG. 1 is a diagram of a vehicle control system 100 that includes a vehicle 110 operable in autonomous ("autonomous" by itself in this disclosure means "fully autonomous"), semi-autonomous, and occupant piloted (also referred to as non-autonomous) mode. Vehicle 110 also includes one or more computing devices 115 for processing data for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, Bluetooth® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or service controller 200.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate or control vehicle 110 operational behaviors (i.e., physical manifestations of vehicle 110 operation) such as speed, acceleration, deceleration, steering, etc. The computer 115 may further include programming to regulate or control vehicle 110 tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

A vehicle 110 equipped for autonomous operation can be configured without traditional controls for operation by an operator, for example, a steering wheel, brake pedal, accelerator pedal, and on/off switch. The vehicle 110 can be programmed to travel a route, like a shuttle bus, or receive a destination from an occupant, for example. No control input from the occupant is required or permitted, therefore traditional controls are an unnecessary expense and unnecessary opportunity for unwanted occupant control of a vehicle 110. In a vehicle 110 without conventional controls, it can be advantageous to permit a user to control a vehicle 110 by actuating steering, powertrain and braking with a service controller in situations where autonomous operation of a vehicle 110 is not available or preferred.

For example, if a computing device 115 in a vehicle 110 detects a problem, e.g., a fault code is provided via a CAN bus or the like, with one or more vehicle sensors 116, the computing device 115 can determine that autonomous operation is unreliable due to missing or incorrect sensor data and direct the vehicle 110 to park and wait for assistance. In this example, the vehicle 110 steering, braking and powertrain components are operating correctly, but the vehicle 110 will need to be brought to a service center to fix the sensor problem.

In other examples, autonomous operation of a vehicle can be geo-fenced. Geo-fencing includes determining a geographic location of a vehicle 110 in global coordinates, for example latitude, longitude and altitude, where geographic locations are mapped to include areas where a vehicle 110 is permitted to operate autonomously and areas where autonomous operation is prohibited. For example, an autonomous vehicle can be used as a shuttle vehicle, where the vehicle 110 is limited to operating along a fixed route enforced by geo-fencing. In this example, the vehicle 110 may need to be brought to and retrieved from the geo-fenced fixed route area through areas where autonomous operation is prohibited or not preferred.

A service controller can also be advantageous for moving a vehicle 110 within a manufacturing plant, service center, or the like, where frequent, short vehicle 110 moves can be preferably performed with a service controller. In these examples a tow vehicle can be dispatched to collect a disabled vehicle 110 and bring it to a service center or move a vehicle 110 to and from a shuttle route or within a service center. Because a vehicle 110 can be capable of non-autonomous or semi-autonomous operation while not being able to operate autonomously, it can be advantageous to operate a vehicle 110 with a service controller and avoid dispatching a tow vehicle to move a vehicle 110 in situations where autonomous operation is not available or permitted.

Figure 2:
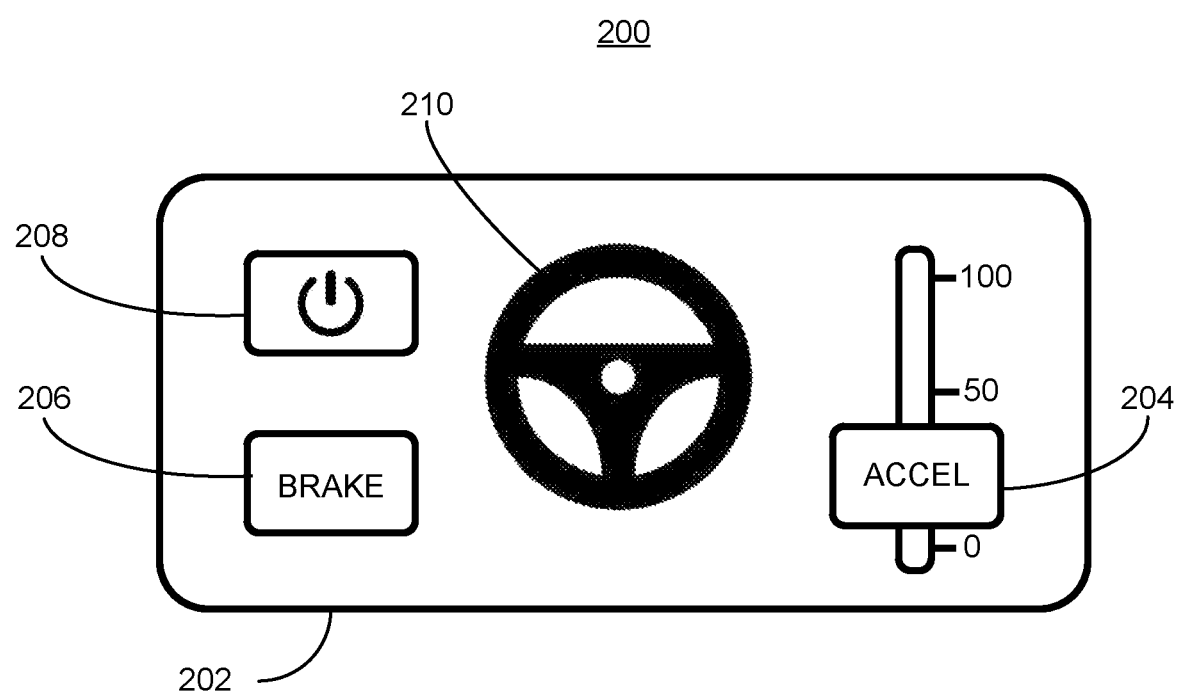
FIG. 2 is a diagram of an example vehicle service controller.

FIG. 2 is a diagram of a service controller 200. Service controller 200 can be a handheld device that includes a computing device including a processor and memory, the memory including instructions to operate the controller as described herein. The service controller 200 can include one or more input mechanisms such as a touchscreen 202. The example touchscreen 202 shown in FIG. 2 receives as input an operator screen touches directed to an icon 204, 206, 208, 210 displayed on the touchscreen 202, e.g., an accelerator icon 204, a brake icon 206, an on/off icon 208 and a steering icon 210. Touching an icon 204, 206, 208, 210 will cause controller 200 to transmit one or more commands to a computing device 115 in a vehicle 110. Computing device 115 interprets the commands received from service controller 200 as if the commands were received from physical controls included in the vehicle 110. Computing device 115 can interpret commands from service controller 200 into commands to direct controllers 112, 113, 114 to control vehicle powertrain, steering and brakes as if physical controls had been used. For example, touching the steering icon 210 will cause the vehicle's wheels to turn as if a traditional steering wheel had been turned by an operator. Likewise, touching the brake icon 206 and accelerator icon 204 can cause the vehicle 110 brakes and powertrain to operate respectively. Touching the on/off icon 208 can cause the vehicle 110 to turn on or off in similar fashion to turning a vehicle on or off with a key, for example. A service controller 200 can also include GPS and inertial measurement unit (IMU) sensors to determine the location of service controller 200 in global coordinates, such as latitude, longitude and altitude.

A service controller 200 can be implemented using smart phone technology, for example. Smart phones include processors, memory, touch screen displays, near-field communications, Wi-Fi, cellular networking, and video acquisition, for example. A service controller can also include mechanical user input devices including a mechanical joystick control, mechanical buttons, mechanical sliders, along with displays to indicate status.

A typical prerequisite to operating an autonomous vehicle 110 with a service controller 200 is authenticating an operator, i.e., determining that an operator of the service controller 200 is permitted to operate the vehicle 110, and that the service controller 200 is not used to operate an autonomous vehicle 110 in an unauthorized fashion. For example, unauthorized use of an autonomous vehicle 110 could include being operated outside of a designated area, or stolen by an unauthorized operator. Authenticating an operator can include confirming the identity of the operator and determining that the identified operator is authorized to operate the service controller. Determining that the operator is authorized can include determining that information regarding the operator is stored in a predetermined list or database of authorized operators. Information regarding operator authorization can be entered into the list or database prior to the time at which the operator is authenticated.

Techniques described herein can improve operation of an autonomous vehicle 110 by requiring that the operator be authenticated, the vehicle be identified, and the service controller 200 be electronically paired with the vehicle 110 before permission is granted by a server computer 120 to the service controller 200 operate the vehicle 110. The server computer 120 also grants permission to the vehicle 110 to be controlled by the service controller 200. Permission to operate the vehicle 110 can be transmitted to the service controller 200 from the server computer 120 via a network 130, for example. Permission to be operated by the service controller 200 can be transmitted to the vehicle 110 from the server computer 120 via the network 130.

Receiving permission to operate a vehicle 110 with a service controller 200 begins by receiving, at the service controller 200, authentication of an operator from a server computer 120. The authentication can be received in response to inputting operator identification information or to a service controller 200 and uploading the operator identification information to a server computer 120. For example, operator identification information can be a user identification string (i.e., of alpha-numeric characters) and a password entered into the service controller 200. The service controller 200 can alternatively or additionally acquire and upload biometric data to identify the operator, such as a fingerprint, a retina scan or a three-dimensional face scan. The operator could further alternatively or additionally use an electronic key fob or the like, which can be an electronic device that identifies the operator to the service controller 200 via plugging the electronic key into the service controller 200 or communicating with the service controller 200 via a near-field wireless network like BLUETOOTH. The service controller 200 can upload the biometric data, electronic key data, or password data to a server computer 120.

A server computer 120 can receive operator identification information from a service controller 200 and determine whether the identified operator is authorized to control vehicle 110 with a service controller 200. This can be a two-step process wherein the server computer 120 first determines that an operator is correctly identified and then determines that the identified operator is authorized to operate vehicles by determining that the identified operator is in a database of authorized operators, for example. When the server computer 120 determines that the operator is authorized, the server computer 120 can download authorization to the service controller 200 that permits the operator to perform further functions with the service controller 200. Determining that an operator can operate a vehicle 110 with a service controller 200 includes determining that the operator is not currently authorized to operate another vehicle 110 or another service controller 200. Communications between the service controller and the server computer 120 can be encrypted to prevent an unauthorized user from intercepting communications between the service controller 200 and the server computer 120, and thereby gain unauthorized access to a service controller 200 or vehicle 110.

Server computer 120 can rely on scalable, cloud-based computing resources to authenticate an operator and maintain lists of authorized operators. For example, AMAZON™ Web Services (AWS) (provided by AMAZON, Inc., Seattle, Wash. 98101) includes secure, distributed, scalable computing resources including database, security, artificial intelligence, etc. that can be used to create custom applications. Cloud computing resources such as AWS can be configured to include security features like authentication and encryption to ensure secure operation. Cloud computing resources as that term is used herein mean computing resources that are accessed via a wide area network (typically the Internet), and that can be distributed over geographically separate "server farms" that can each include tens or hundreds of thousands of server computers or more.

Cloud computing resources can scale to handle increasing numbers of users accessing increasing amounts of data by adding hardware and software resources dynamically over a distributed network of servers in response to input load. By scaling in this fashion, an operator authentication application can be configured to include a very large number of vehicles 110 ($>1\times10^8$), operators ($>1\times10^7$), and service controllers 200 ($>1\times10^7$) while performing a large number of transactions ($>1\times10^4$) per second over large geographic areas like the United States.

Further by scaling in this fashion, applications developed on a secure, distributed, scalable cloud computing resource network like AWS can handle a large number of transactions per unit time over a very large geographic area and maintain database integrity, wherein a distributed database with multiple copies of some data and multiple servers performing transactions maintains the database as if it were a single database with a single input and output. A transaction is an exchange of a request and a response for information between a server computer 120 and a cloud application, for example. A secure transaction is an exchange of information between server computer 120 and a cloud application that is encrypted. A secure, distributed, scalable cloud computing resource network like AWS can handle a large number of secure transactions on a very large database over a larger geographic area while maintaining acceptable response time. Acceptable response time is typically defined as less than a few seconds, which can be 3 seconds, for example.

Cloud computing resources can accomplish this by allocating hardware and software computing resources dynamically in response to system load. Cloud servers are typically configured to allocate distributed computing resources seamlessly, meaning that a cloud client like a server computer 120 would not notice any change in operation despite changes in computing resource allocation caused by increased system load. Allocating distributed computing resources provides physical redundancy and thereby increases availability and reliability in addition to providing acceptable response time. Scalable, cloud-based computing resources like cloud, permits server computer 120 to send and receive operator authentication information 24/7 availability with seamless and acceptable operation over an expected large number of vehicles 110, operators, and service controllers 200 performing large numbers of transactions per second over large geographic areas like the United States, for example.

Figure 3:
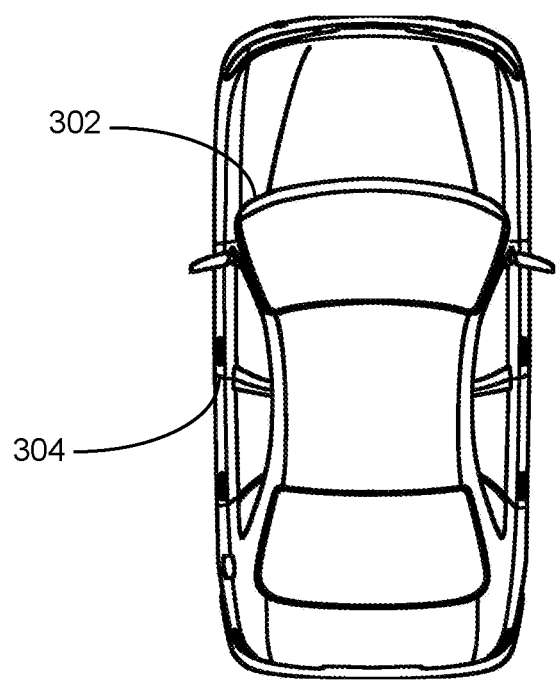
FIG. 3 is a diagram of an example vehicle.

Following authorization of the operator, the service controller 200 can identify a vehicle 110 by scanning a physical code, including a vehicle identification code, to determine an identity of a vehicle 110. The vehicle identification code can be a license plate, vehicle identification numbers (VIN), a bar code or a two-dimensional identification symbol, for example. FIG. 3 is a diagram of a vehicle 110 illustrating locations of VINs 302, 304 on a vehicle 110. VINs are 17-digit numbers that are required by laws in most countries of the world to identify manufactured vehicles. Locations can vary slightly between manufacturers and by year, but in general, VIN numbers 302, 304 are visible at the lower left corner of the windshield (VIN 302), or on the left-hand door jamb (VIN 304). The service controller 200 can identify a vehicle 110 by scanning a VIN 302, 304. In some examples, scanning is performed by acquiring an image of the VIN 302, 304 and performing optical character recognition (OCR) on the image to determine the digits of the VIN 302, 304. OCR is a machine vision technique that determines whether image data corresponding to alphanumeric characters are present in an image and if so, which alphanumeric characters are present. OCR can operate by performing matched filters corresponding to font, style, size, and orientation of alphanumeric characters to determine a digital character and location. In similar fashion, service controller 200 can acquire an image of a vehicle license plate and recognize a license plate number as a vehicle identification code.

A vehicle 110 can also be identified by scanning a bar code or other two-dimensional identification symbol (2D ID). Scanning can be performed by acquiring an image of the 2D ID or directing a laser beam so as to sweep across the area of the 2D ID and acquire light energy reflected by the 2D ID. Whether a license plate, VIN 302, 304, or 2D ID is scanned, the service controller 200 can upload the acquired vehicle identification code to a server computer 120.

Upon receiving the vehicle identification code, a server computer 120 can determine a vehicle 110 identity by using the vehicle identification code to access a distributed, scalable, cloud-based database of vehicle identities. As discussed above, the secure, distributed, scalable, cloud-based computing resources in a system like cloud can be used to host a database application that can be used to determine a vehicle identity based on a vehicle identification code. A vehicle identification code can be used as an index into a very, very large database of vehicle information using "big data" cloud database applications to return information relevant to vehicle identity. For example, server computer 120 can compare a physical location for a vehicle 110 determined by a service controller 200 with an expected physical location determined by a cloud database application. (A physical location, or simply a "location" is a location that can be, and in the context of this disclosure typically is, specified by geo-coordinates or the like.) A cloud database application can also return information to server computer 120 regarding the ability of vehicle 110 to accept control by service controller 200 including whether a vehicle 110 is currently being controlled by another service controller 200 or operator. A cloud database application can also return information to server computer 120 regarding any geo-fencing information associated with a vehicle 110.

Following authorization of the operator and identification of the vehicle 110, service controller 200 can pair electronically with the vehicle 110 via a short-range network such as BLUETOOTH. Pairing can include computing device 115 in a vehicle 110 communicating with a computing device in the service controller 200 to determine pairing information and verify that service controller 200 can communicate with vehicle 110. Service controller 200 can upload the pairing information to a server computer 120 via a network 130. Server computer 120 can analyze the pairing information to determine that the operator/vehicle combination is correct, e.g. the service controller 200 is correct for the vehicle 110, meaning that the service controller 200 and the vehicle 110 are compatible and the pairing is expected according to a previously determined schedule, previously scheduled service, or expected based on the time and physical location, for example. Based on operator authentication, vehicle identity, and correct pairing, server computer 120 can grant permission to service controller 200 to control vehicle 110 and command vehicle 110 to accept commands from service controller 200 via network 130. The permission information can be encrypted to prevent unauthorized vehicle 110 operation.

Figure 4:
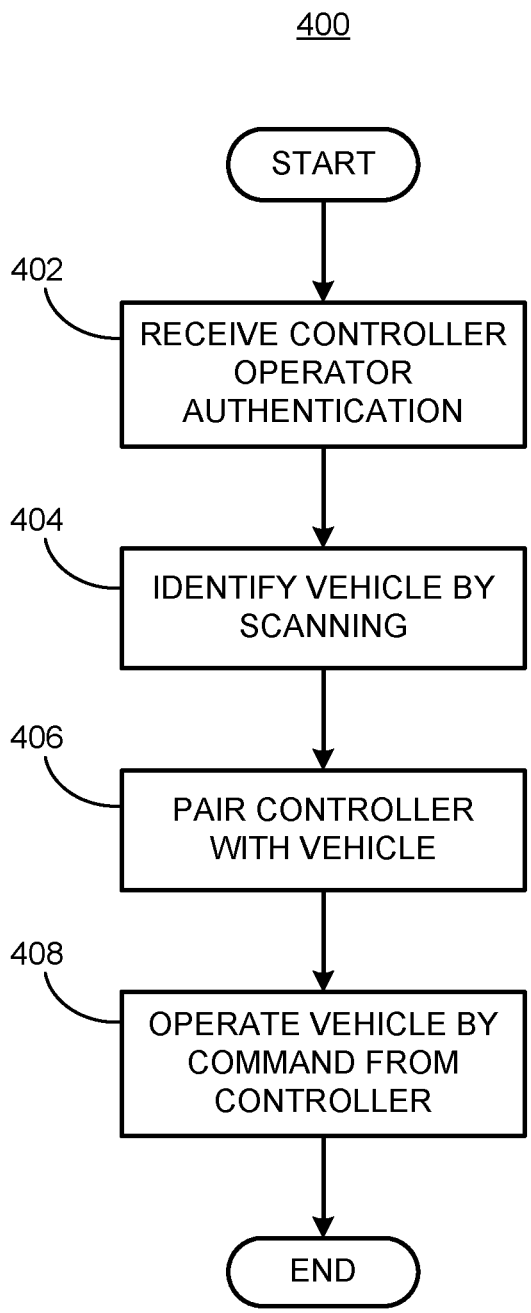
FIG. 4 is a flowchart diagram of a process to operate a vehicle by command from a service controller.

FIG. 4 is a diagram of a flowchart, described in relation to FIGS. 1-3, of a process 400 for operating a vehicle 110 on command(s) from a service controller 200. Process 400 can be implemented by a processor of computing device 115, taking as input information from sensors 116, and executing commands and sending control signals via controllers 112, 113, 114, for example. Process 400 includes multiple blocks taken in the disclosed order. Process 400 could alternatively or additionally include fewer blocks or can include the blocks taken in different orders.

Process 400 begins at block 402, where a service controller 200 receives operator authorization. Operator authorization is received by the service controller 200 in response to a request for operator authentication communicated to a server computer 120. A request for authentication is made by an operator to initiate operation of a vehicle 110. An operator must submit a means of identification to the service controller 200 to be authorized to operate a vehicle 110 with the service controller. The request for authentication includes a means for identifying an operator, including a password, biometric data including a fingerprint or retinal scan, or a hardware key. The server computer 120 can access a secure, distributed, scalable, cloud-based application via a network 130 to determine operator authorization as discussed above in relation to FIG. 2.

At block 404, service controller 200 identifies a vehicle 110 by scanning a vehicle identification code. The vehicle identification code can be a license plate, a VIN, a bar code or 2D-ID. The scanning can be image acquisition using a video camera or laser scanning. Service controller 200 uploads the scanned vehicle identification code to a server computer 120. The server computer can determine a vehicle identity based on the scanned vehicle identification code using distributed, scalable, cloud-based database applications as discussed above in relation to FIG. 3.

At block 406, service controller 200 pairs with a vehicle 110. Pairing in this block includes communicating with a computing device 115 included in vehicle 110 to determine that commands can be sent and received by computing device 115 in a reliable and timely fashion. Service controller 200 can measure the round-trip message time and message error rate to determine communications quality, where reliable and timely communications is defined as receiving communications with 99% accuracy with less than 100 milliseconds round-trip message-response time, for example. Pairing in the block 406 can also include information regarding other current pairings with other controllers 200 that vehicle 110 can currently have, obtained when authorizing the operator and identifying the vehicle. Pairing in the block 406 can also include determining whether the vehicle 110 can be controlled by a service controller 200. Service controller 200 can determine whether vehicle 110 can be controlled by establishing communications with vehicle 110 and receiving a message from vehicle 110 acknowledging control by service controller 200. Service controller 200 uploads this pairing information to server computer 120.

At block 408, based on operator authorization, vehicle identity, and pairing information, server computer 120 determines whether to grant permission to server controller 200 to operate vehicle 110. Determining permission by server computer 120 based on operator authorization, vehicle identity, and pairing information is discussed below in relation to FIG. 5. In examples where permission is granted, server computer 120 communicates the permission to the service controller 200 to permit an operator to use the service controller 200 to operate the vehicle 110. In examples where permission in not granted, permission is not communicated to service controller 200 and an operator therefore cannot use the service controller 200 to operate the vehicle 120. Following block 408 process 400 ends.

Figure 5:
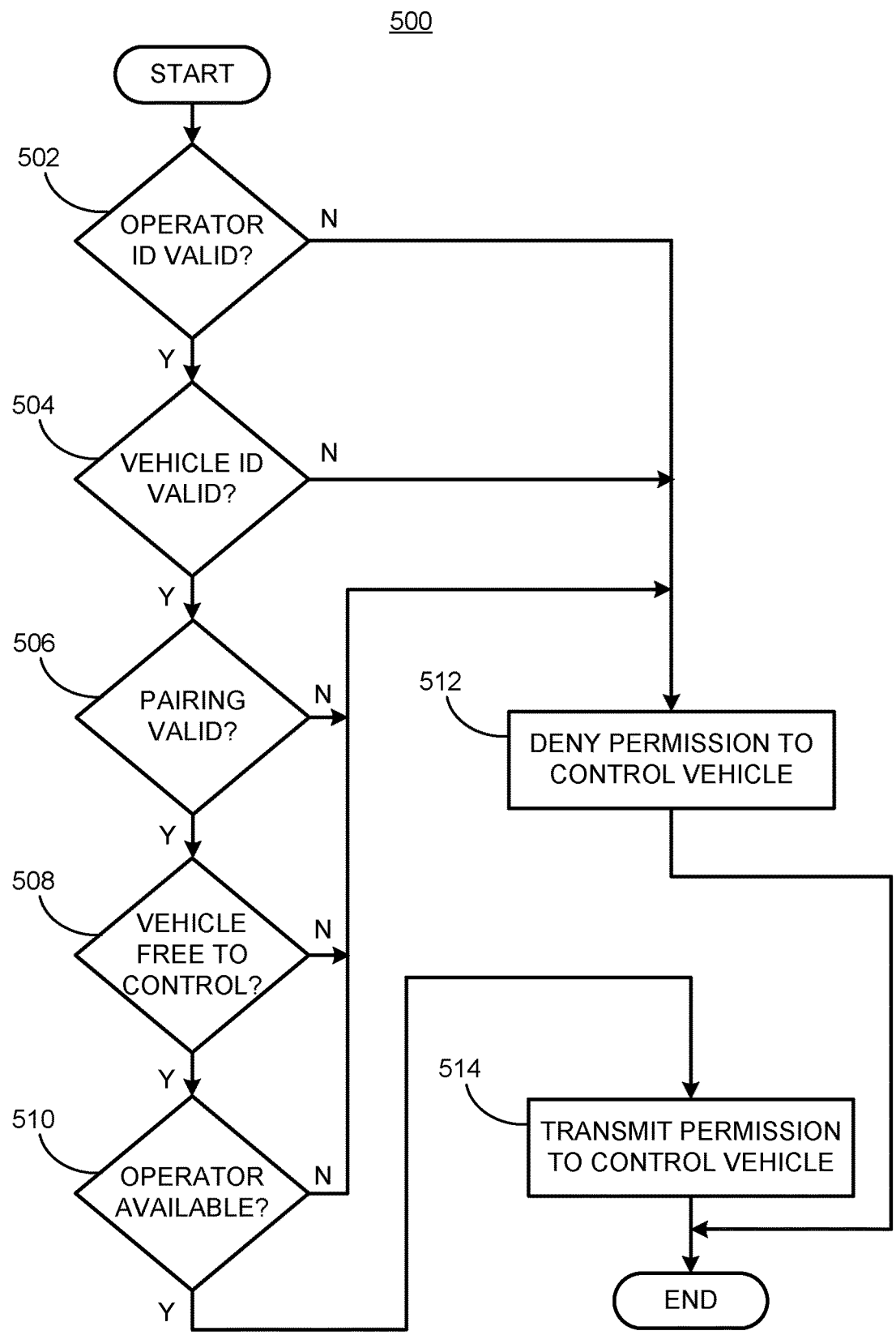
FIG. 5 is a flowchart diagram of a process to determine permission to operate a vehicle by command from a service controller.

FIG. 5 is a diagram of a flowchart, described in relation to FIGS. 1-4, of a process 500 for determining permission to operate a vehicle 110. Process 500 can be implemented by a processor of computing device 115, taking as input information from sensors 116, and executing commands and sending control signals via controllers 112, 113, 114, for example. Process 500 includes multiple blocks taken in the disclosed order. Process 500 could alternatively or additionally include fewer blocks or can include the blocks taken in different orders.

Process 500 begins at block 502, wherein a server computer 120 receives operator authorization information from a service controller 200. The server computer 120 can send an authorization request to a distributed, scalable, cloud-based authentication application to determine if the operator is authorized to operate vehicle 110 with service controller 200 as described above in relation to FIG. 2. If an operator is authorized to operate vehicle 110 with service controller 200, process 500 passes to a block 504. If an operator is not authorized to operate vehicle 110 with service controller 200, process 500 passes to a block 512.

At block 504, a server computer 120 receives a vehicle identification code from a service controller 200. The server computer can send a request including the vehicle identification code to a distributed, scalable, cloud-based database application to determine a vehicle identity. If the vehicle identity is valid and describes the vehicle 110 that is expected to be at the physical location specified by service controller 200 based on included GPS and INU sensors, process 500 passes to block 506. If the vehicle identity does not correspond to a vehicle 110 that is expected to be at the location indicated by service controller 200 or does not correspond to a vehicle 110 capable of being controlled by controller 200, process 500 passes to block 512.

At block 506, a server computer 120 receives pairing information from a server controller 200 that corresponds to information regarding the communications link between vehicle 110 and server controller 200. If the pairing information indicates that service controller 200 can successfully control vehicle 110, i.e. communication is successful and vehicle 110 acknowledges control by service controller 200, process 500 passes to block 508. If the pairing information indicates that service controller 200 cannot successfully control vehicle 110, process 500 passes to block 512.

At block 508, server computer 120 examines vehicle identity information downloaded at block 504 to determine if vehicle 110 is currently being controlled by another service controller 200. Server computer 120 can also determine if vehicle 110 is subject to geo-fencing limitations on travel, and if the restrictions need to be waived to permit the vehicle 110 to be operated by service controller 200. For example, a vehicle can be geo-fenced to remain within restricted routes that include passenger pickup, passenger drop off, service and storage for operation as a shuttle service at an airport or resort. When removing a vehicle 110 from the restricted routes for replacement or extended service, the geo-fencing would have to be over-ridden at the server computer 120 to permit an operator to operate the vehicle off the restricted routes with a service controller 200. If the vehicle 110 can be operated, process 500 passes to block 510. If the vehicle is not free to be operated, process 500 passes to block 512.

At block 510, server computer 120 determines if the operator is available to operate a first vehicle 110. Server computer 120 can determine, based on operator authorization information downloaded at block 502, that the operator is operating at least one second vehicle 110 with more than one service controller 200. If the operator is operating only one vehicle 110, process 500 passes to block 514. If the operator is attempting to operate more than one vehicle 110, control passes to block 512.

At block 512, server computer 120 denies permission for an operator to operate a vehicle 110 with a service controller 200 by sending commands to service controller 200 and vehicle 110 to prevent service controller 200 from operating vehicle 110 as discussed above in relation to FIG. 3. Following this block process 500 ends.

At block 514, server computer 120 grants permission to service controller 200 to control vehicle 110 by sending commands to service controller 200 and vehicle 110 to permit service controller 200 to operate vehicle 110 as discussed above in relation to FIG. 3. Following this block 514 process 500 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
    receiving authentication of an operator of a hand-held service controller configured to control a vehicle instead of physical controls in the vehicle, whereby the vehicle is controllable without the physical controls for steering, braking, and acceleration, from a server computer;
    identifying the vehicle for control by the hand-held service controller, whereby the hand-held service controller is configured to control operation of one or more of vehicle powertrain, vehicle steering or vehicle braking by scanning a physical code with the hand-held service controller;
    pairing the hand-held service controller with the vehicle;
    receiving permission to operate the vehicle at the hand-held service controller from a server computer based on comparing a first vehicle identity based on scanning the physical code with a second vehicle identity based on pairing the hand-held service controller with the vehicle; and
    operating the vehicle by a command from the hand-held service controller.

2. The method of claim 1, wherein scanning the physical code further comprises scanning of one or more of a bar code, a license plate or a VIN number.

3. The method of claim 1, wherein pairing the hand-held service controller further comprises communicating with the vehicle via a near-field wireless network.

4. The method of claim 1, wherein authenticating the operator further comprises uploading one or more of biometric data, an electronic key or a password to the server computer.

5. The method of claim 1, wherein the server computer determines the permission to operate based on authenticating the operator.

6. The method of claim 1, wherein the server computer determines the permission to operate based on a geographic location of the vehicle.

7. A system, comprising a processor; and
    a memory, the memory including instructions to be executed by the processor to:
        receive authentication of an operator of a hand-held service controller configured to control a vehicle instead of physical controls in the vehicle, whereby the vehicle is controllable without the physical controls for steering, braking, and acceleration, from a server computer;
        identify the vehicle for control by the hand-held service controller, whereby the hand-held service controller is configured to control operation of one or more of vehicle powertrain, vehicle steering or vehicle braking by scanning a physical code with the hand-held service controller;
        pair the hand-held service controller with the vehicle;
        receive permission to operate the vehicle at the hand-held service controller from a server computer based on comparing a first vehicle identity based on scanning the physical code with a second vehicle identity based on pairing the hand-held service controller with the vehicle; and
        operate the vehicle by a command from the hand-held service controller.

8. The system of claim 7, wherein scanning the physical code further comprises scanning of one or more of a bar code, a license plate or a VIN number.

9. The system of claim 7, wherein pairing the hand-held service controller further comprises communicating with the vehicle via a near-field wireless network.

10. The system of claim 7, wherein authenticating the operator further comprises uploading one or more of biometric data, an electronic key or a password to the server computer.

11. The system of claim 7, wherein the server computer further includes instructions to determine the permission to operate based on authenticating the operator.

12. The system of claim 7, wherein the server computer further includes instructions to determine the permission to operate based on a geographic location of the vehicle.

13. A system, comprising:
    means for controlling vehicle steering, braking and powertrain; and
    means for:
        receiving authentication of an operator of a hand-held service controller configured to control a vehicle instead of physical controls in the vehicle, whereby the vehicle is controllable without the physical controls for steering, braking, and acceleration, from a server computer;
        identifying the vehicle for control by the hand-held service controller, whereby the hand-held service controller is configured to control operation of one or more of vehicle powertrain, vehicle steering or vehicle braking by scanning a physical code with the hand-held service controller;
        pairing the hand-held service controller with the vehicle;
        receiving permission to operate the vehicle at the hand-held service controller from a server computer based on comparing a first vehicle identity based on scanning the physical code with a second vehicle identity based on pairing the hand-held service controller with the vehicle; and
        operating the vehicle with the hand-held service controller and the means for controlling vehicle steering, braking and powertrain.

14. The system of claim 13, wherein means for identifying a vehicle by scanning the physical code includes scanning one or more of a bar code, a license plate or a VIN number with the hand-held service controller.

15. The method of claim 1, wherein the permission is encrypted.

16. The method of claim 1, wherein the permission is transmitted to the vehicle.

17. The method of claim 1, wherein the permission is denied when the operator is operating more than one vehicle.

18. The system of claim 7, wherein the permission is encrypted.

19. The system of claim 7, wherein the permission is transmitted to the vehicle.

20. The system of claim 7, wherein the permission is denied when the operator is operating more than one vehicle.

* * * * *